US009966822B2

(12) United States Patent
Kim et al.

(10) Patent No.: US 9,966,822 B2
(45) Date of Patent: May 8, 2018

(54) WASHING MACHINE DRIVING APPARATUS AND WASHING MACHINE COMPRISING SAME

(71) Applicant: AMOTECH CO., LTD., Incheon (KR)

(72) Inventors: Byung Soo Kim, Anyang-si (KR); Jong Ha Shin, Seoul (KR)

(73) Assignee: AMOTECH CO., LTD., Incheon (KR)

(*) Notice: Subject to any disclaimer, the term of this patent is extended or adjusted under 35 U.S.C. 154(b) by 326 days.

(21) Appl. No.: 14/721,233

(22) Filed: May 26, 2015

(65) Prior Publication Data
US 2015/0256056 A1 Sep. 10, 2015

Related U.S. Application Data

(62) Division of application No. PCT/KR2013/011816, filed on Dec. 18, 2013.

(30) Foreign Application Priority Data

Dec. 18, 2012 (KR) .................. 10-2012-0148565
Dec. 18, 2012 (KR) .................. 10-2012-0148566
(Continued)

(51) Int. Cl.
D06F 37/30 (2006.01)
H02K 16/02 (2006.01)
(Continued)

(52) U.S. Cl.
CPC .............. H02K 16/02 (2013.01); D06F 17/08 (2013.01); D06F 23/04 (2013.01); D06F 37/30 (2013.01);
(Continued)

(58) Field of Classification Search
CPC ...... D06F 37/304; D06F 37/40; D06F 37/206; H02K 1/148; H02K 7/14
(Continued)

(56) References Cited

U.S. PATENT DOCUMENTS 6,257,027 B1* 7/2001 Imai ................... D06F 37/304
68/12.12
7,317,272 B2* 1/2008 Shiga ..................... H02K 29/08
310/156.12
(Continued)

FOREIGN PATENT DOCUMENTS

JP 2006043153 2/2006
JP 2007295668 11/2007
(Continued)

OTHER PUBLICATIONS

International Search Report—PCT/KR2013/011816 dated Apr. 18, 2014.

Primary Examiner — David G Cormier
Assistant Examiner — Thomas Bucci
(74) Attorney, Agent, or Firm — Cantor Colburn LLP

(57) ABSTRACT

A washing machine driving apparatus includes: an outer shaft connected with a washing tub; an inner shaft rotatably arranged inside the outer shaft and connected with a pulsator; an inner rotor connected with the outer shaft; an outer rotor connected to the inner shaft; and a stator disposed with an air gap between the inner rotor and the outer rotor, The stator comprises: stator cores; a bobbin wrapped on the outer surface of each of the stator cores; a first coil wound on one side of each of the stator cores; and a second coil wound on the other side of each of the stator cores A first bearing and a second bearing are disposed on the outer circumferential surface of the outer shaft. The first bearing and the second (Continued)

bearing are mounted in a first bearing housing and a second bearing housing fixed to an outer tub.

7 Claims, 11 Drawing Sheets

(30) Foreign Application Priority Data

May 27, 2013 (KR) ........................ 10-2013-0059769
May 27, 2013 (KR) ........................ 10-2013-0059770

(51) Int. Cl.
| | | |
|---|---|---|
| *D06F 17/08* | (2006.01) | |
| *D06F 23/04* | (2006.01) | |
| *D06F 37/40* | (2006.01) | |
| *H02K 7/00* | (2006.01) | |
| *H02K 1/18* | (2006.01) | |
| *H02K 1/27* | (2006.01) | |
| *H02K 1/30* | (2006.01) | |
| *H02K 3/28* | (2006.01) | |
| *H02K 1/14* | (2006.01) | |
| *H02K 5/08* | (2006.01) | |
| *H02K 5/22* | (2006.01) | |
| *H02K 7/08* | (2006.01) | |
| *H02K 16/00* | (2006.01) | |
| *H02K 21/16* | (2006.01) | |
| *H02K 21/22* | (2006.01) | |

(52) U.S. Cl.
CPC ............ *D06F 37/40* (2013.01); *H02K 1/148* (2013.01); *H02K 1/18* (2013.01); *H02K 1/187* (2013.01); *H02K 1/27* (2013.01); *H02K 1/30* (2013.01); *H02K 3/28* (2013.01); *H02K 5/08* (2013.01); *H02K 5/225* (2013.01); *H02K 7/003* (2013.01); *H02K 7/083* (2013.01); *H02K 7/085* (2013.01); *H02K 16/00* (2013.01); *H02K 21/16* (2013.01); *H02K 21/222* (2013.01)

(58) Field of Classification Search
USPC .... 68/140, 23.7, 133, 24, 12.24, 3 R, 12.16, 68/12.02, 23 R, 23.6, 23.3; 310/43, 114, 310/71, 67 R, 91, 266, 156.12, 156.26, 310/51, 90, 112, 156.01
See application file for complete search history.

(56) References Cited

U.S. PATENT DOCUMENTS

| | | | | |
|---|---|---|---|---|
| 2006/0042022 A1* | 3/2006 | Kim | ...................... | D06F 37/304 8/159 |
| 2007/0205682 A1* | 9/2007 | Choi | ...................... | D06F 37/304 310/114 |
| 2007/0236099 A1* | 10/2007 | Kim | ...................... | D06F 37/304 310/266 |
| 2008/0110213 A1* | 5/2008 | Choi | ...................... | D06F 37/304 68/140 |
| 2009/0064726 A1* | 3/2009 | Choi | ...................... | D06F 37/206 68/140 |
| 2009/0064727 A1* | 3/2009 | Choi | ...................... | D06F 37/206 68/140 |
| 2009/0064728 A1* | 3/2009 | Choi | ...................... | D06F 37/304 68/140 |
| 2009/0115278 A1* | 5/2009 | Choi | ...................... | D06F 37/304 310/156.12 |
| 2010/0050702 A1* | 3/2010 | Kim | ...................... | D06F 37/304 68/23 R |
| 2010/0058817 A1* | 3/2010 | Yoshikawa | ........... | D06F 37/304 68/139 |
| 2010/0156231 A1* | 6/2010 | Lee | ...................... | H02K 1/148 310/179 |

FOREIGN PATENT DOCUMENTS

| | | |
|---|---|---|
| KR | 1020060005647 | 1/2006 |
| KR | 1020060020266 | 3/2006 |
| KR | 1020060088238 | 8/2006 |
| KR | 1020110139434 | 12/2011 |
| WO | 2012169774 | 12/2012 |

* cited by examiner

WASHING MACHINE DRIVING APPARATUS AND WASHING MACHINE COMPRISING SAME

CROSS REFERENCE TO RELATED APPLICATIONS

This application is a divisional of International Application No. PCT/KR2013/011816, filed on Dec. 18, 2013, which claims priority to and the benefit of Korean Application Nos. 10-2012-0148565 filed on Dec. 18, 2012; 10-2012-0148566 filed on Dec. 18, 2012; 10-2013-0059769 filed on May 27, 2013; and 10-2013-0059770 filed on May 27, 2013, in the Korean Patent Office, the entire contents of which are incorporated herein by reference.

TECHNICAL FIELD

The present invention relates to a washing machine driving apparatus and a washing machine having the same in which a washing tub and a pulsator are directly connected to the washing machine driving apparatus, to thus drive the washing tub and the pulsator, respectively, without having a separate intermediate mediator.

BACKGROUND ART

As disclosed in Korean Patent Registration Publication No. 10-0548310 (Jan. 24, 2006), the conventional washing machine includes: an outer case forming an outer shape; an outer tub which is supported on an inside of the outer case for receiving wash water therein; an inner tub which is rotatably accommodated in an inside of the outer tub and is used for both washing and dehydrating; a pulsator which is mounted in an inside of the inner tub relatively rotatably, to form a washing water flow; a drive motor for generating a driving force for rotating the inner tub and the pulsator; an inner tub rotating shaft which receives the driving force of the drive motor for rotating the inner tub; a pulsator rotating shaft which receives the driving force of the drive motor for rotating the pulsator; a sun gear which is connected to the drive motor and is connected to the pulsator rotating shaft; a plurality of planetary gears which are simultaneously engaged with the sun gear and a ring gear; a carrier supporting the planetary gears so as to be rotated and revolved; and a clutch spring for controlling the rotation of the inner tub and the pulsator during washing or dehydrating.

The conventional washing machine has a planetary gear set including the sun gear, the ring gear, the planetary gears and the carrier, and reduces the rotating force of the drive motor, to then be transferred to the pulsator and the inner tub, and operates a clutch spring to selectively transmit power to the pulsator and the inner tub, to thus rotate only the pulsator or both the pulsator and the inner tub simultaneously.

However, the conventional washing machine needs the planetary gear set and the clutch spring in order to selectively rotate the pulsator and the inner tub, to accordingly cause the configuration of the conventional washing machine to be complicated and the production cost thereof to increase.

Further, since the conventional washing machine is configured to have the planetary gear set and the clutch spring between the drive motor and the outer tub, the space occupied in the height direction of the washing machine is increased and thus the height of the washing machine increases. Otherwise, since the height of the inner tub should be reduced in an identical height of the washing machine, there is a problem that a washing capacity is reduced.

In addition, since the conventional washing machine enables the pulsator and the inner tub to be rotated in an identical direction, but not to be rotated in opposite directions to each other, there is a problem that the washing machine performance is lowered.

SUMMARY OF THE INVENTION

To solve the above problems or defects, it is an object of the present invention to provide a washing machine driving apparatus and a washing machine comprising the same, to remove a clutch and a planetary gear set which form an existing power conversion unit, simplify a manufacturing process, reduce the height of the washing machine, and increase a washing capacity.

In addition, it is another object of the present invention to provide a washing machine driving apparatus and a washing machine comprising the same, to enable a pulsator and a washing tub simultaneously in opposite directions to each other, and to improve performance of the washing machine.

In addition, it is still another object of the present invention to provide a washing machine driving apparatus and a washing machine having the same, in which a coupling unit is integrally formed on a bobbin of a stator, the coupling unit is coupled with a bearing housing fixed to an outer tub with a bolt, to accordingly enable the stator to be fixed on the bearing housing, and to thereby have no need to have a separate component for securing the stator, to thus simplify a manufacturing process and reduce the number of parts required.

In addition, it is yet another object of the present invention to provide a washing machine driving apparatus and a washing machine having the same, in which a stator is directly mounted on an outer tub, without having a separate frame, to thereby reduce the number of parts required, and shorten an assembly process.

In addition, it is still yet another object of the present invention to provide a washing machine driving apparatus and a washing machine having the same, in which a connector for connecting a pulsator to a power supply to rotate the pulsator and a connector for connecting a washing tub to the power supply to rotate the washing tub are separately provided, to thus supply the pulsator and the washing tub with the power separately.

The objects of the present invention are not limited to the above-described objects, and other objects and advantages of the present invention can be appreciated by the following description and will be understood more clearly by embodiments of the present invention.

To accomplish the above and other objects of the present invention, according to an aspect of the present invention, there is provided a washing machine driving apparatus comprising: an outer shaft which is connected with a washing tub; an inner shaft which is rotatably arranged inside the outer shaft and connected with a pulsator; an inner rotor which is connected with the outer shaft; an outer rotor which is connected to the inner shaft; and a stator which is disposed with an air gap between the inner rotor and the outer rotor, wherein the stator comprises: stator cores; a bobbin wrapped on the outer surface of each of the stator cores; a first coil wound on one side of each of the stator cores; and a second coil wound on the other side of each of the stator cores, wherein a first bearing and a second bearing are disposed on the outer circumferential surface of the outer shaft, and the first bearing and the second bearing are mounted in a first bearing housing and a second bearing housing which are fixed to an outer tub, and wherein coupling portions for coupling the stator with the first bearing housing are integrally formed in the bobbins.

Preferably but not necessarily, the first bearing housing comprises: a bobbin coupling portion formed with a plurality of first coupling holes with which the bobbins are circumferentially coupled; a bearing mounting portion which is formed on the inside of the bobbin coupling portion and on which the first bearing is mounted; and an outer tub fixing portion which is formed on the outside of the bobbin coupling portion and fixed to the outer tub.

Preferably but not necessarily, each of the bobbins comprises: a first coil winding portion which is wrapped around the outer surface of the stator core and on which a first coil is wound; a second coil winding portion on which a second coil is wound; and the coupling portion which is extended from the first coil winding portion and coupled with the first bearing housing.

Preferably but not necessarily, the coupling portion is formed in a disc shape which is extended to the end of the first coil winding portion and is in contact with the lower surface of the first bearing housing, in which a plurality of bolt coupling holes are circumferentially formed.

According to another aspect of the present invention, there is provided a washing machine comprising: an outer tub which is suspended and supported on an inside of a case for receiving washing water; a washing tub which is rotatably disposed inside the outer tub to perform washing and dehydrating; a pulsator which is rotatably disposed inside the washing tub to form a washing water flow; and a washing machine driving apparatus which drives the washing tub and the pulsator simultaneously or selectively.

As described above, a washing machine driving apparatus according to the present invention directly connects between a drive motor and both a pulsator and a washing tub, to thereby remove a clutch and a planetary gear set of an existing power conversion unit, and to thus reduce a manufacturing cost and simplify a manufacturing process, while reducing height of a washing machine but increasing a washing capacity.

In addition, the washing machine driving apparatus according to the present invention is configured to directly connect between a pulsator and an outer rotor, and directly connect between a washing tub and an inner rotor, to thereby rotate the pulsator even if only the outer rotor is driven, or to thereby rotate the washing tub even if only the inner rotor is driven, and is configured to rotate the pulsator and the washing tub in different directions, when power is applied to the outer rotor and the inner rotor, respectively, in opposing directions to each other, to thus improve performance of the washing machine.

In addition, the washing machine driving apparatus according to the present invention is configured to integrally form coupling portions on bobbins of a stator, and to couple the coupling portions with a bearing housing, to thus secure the stator, to thus have no need of a separate stator support for securing the stator, or the like, to thereby reduce the number of parts required and simplify a manufacturing process thereof.

Further, the washing machine driving apparatus according to the present invention is configured to integrally form a bearing housing when bobbins of a stator are insert injection molded, to thereby directly fix the stator to an outer tub, and to thus shorten a manufacturing process and reduce the number of parts.

In addition, the washing machine driving apparatus according to the present invention is configured to separately include a connector for connecting power for rotating a pulsator and a connector for connecting power for rotating a washing tub, in which the power connectors for rotating the pulsator and the washing tub are separately provided.

DETAILED DESCRIPTION OF THE INVENTION

Figure 1:
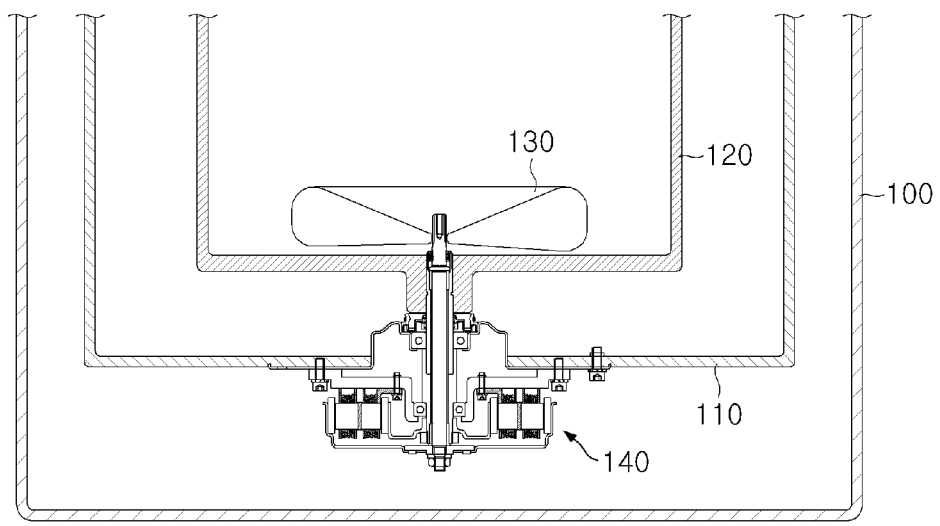
FIG. 1 is a cross-sectional view of a washing machine according to a first embodiment of the present invention.

Hereinafter, embodiments of the present invention will be described in detail with reference to the accompanying drawings. In the process, the size and shape of the components illustrated in the drawings may be shown exaggerated for convenience and clarity of explanation. Further, by considering the configuration and operation of the present invention the specifically defined terms can be changed according to user's or operator's intention, or the custom. Definitions of these terms herein need to be made based on the contents across the whole application.

Figure 2:
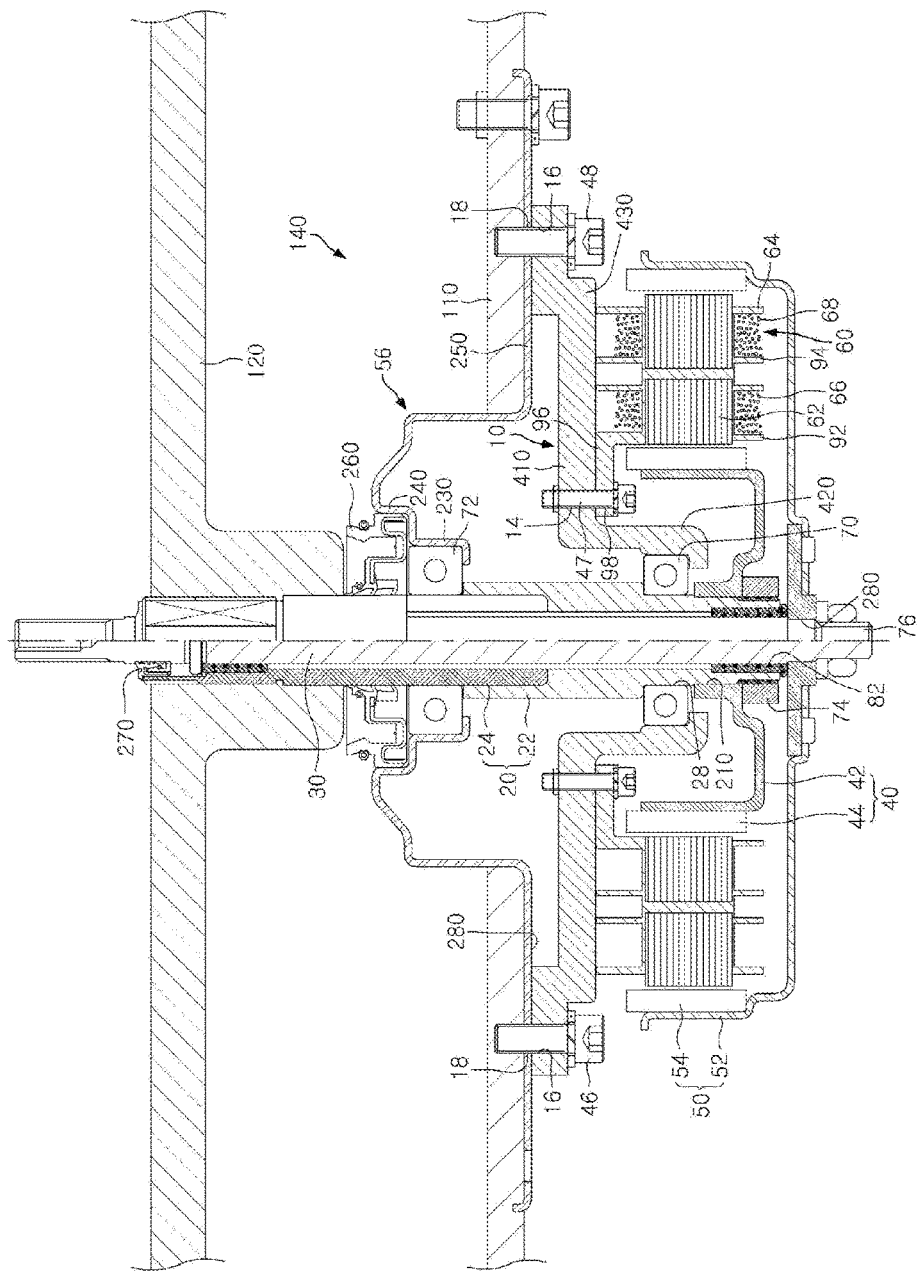
FIG. 2 is a cross-sectional view of a driving apparatus of the washing machine according to the first embodiment of the present invention.

FIG. 1 is a cross-sectional view of a washing machine according to a first embodiment of the present invention, and FIG. 2 is a cross-sectional view of a driving apparatus of the washing machine according to the first embodiment of the present invention.

Referring to FIGS. 1 and 2, the washing machine includes: a case 100 forming an outer appearance; an outer tub 110 which is suspended and supported on an inside of the case 100 for receiving washing water; a washing tub 120 which is rotatably disposed inside the outer tub 110 to perform washing and dehydration; a pulsator 130 which is rotatably disposed inside the washing tub 120 to form a washing water flow; and a washing machine driving apparatus 140 which is mounted on a lower portion of the washing tub 120, to drive the washing tub 120 and the pulsator 130 simultaneously or selectively.

As shown in FIG. 2, the driving apparatus 140 includes: an outer shaft 20 which is connected with the washing tub 120; an inner shaft 30 which is rotatably arranged inside the outer shaft 20 and connected with a pulsator 130; an inner rotor 40 which is connected with the outer shaft 20; an outer rotor 50 which is connected to the inner shaft 30; and a stator 60 which is disposed with an air gap between the inner rotor 40 and the outer rotor 50.

A first bearing 70 and a second bearing 72 which rotatably support the outer shaft 20 are disposed at a predetermined interval on an outer circumferential surface of the outer shaft 20.

The first bearing 70 is supported on the first bearing housing 10, and the second bearing 72 is supported on the second bearing housing 56. The first bearing housing 10 and the second bearing housing 56 are fixed to the outer tub 110.

Figure 3:
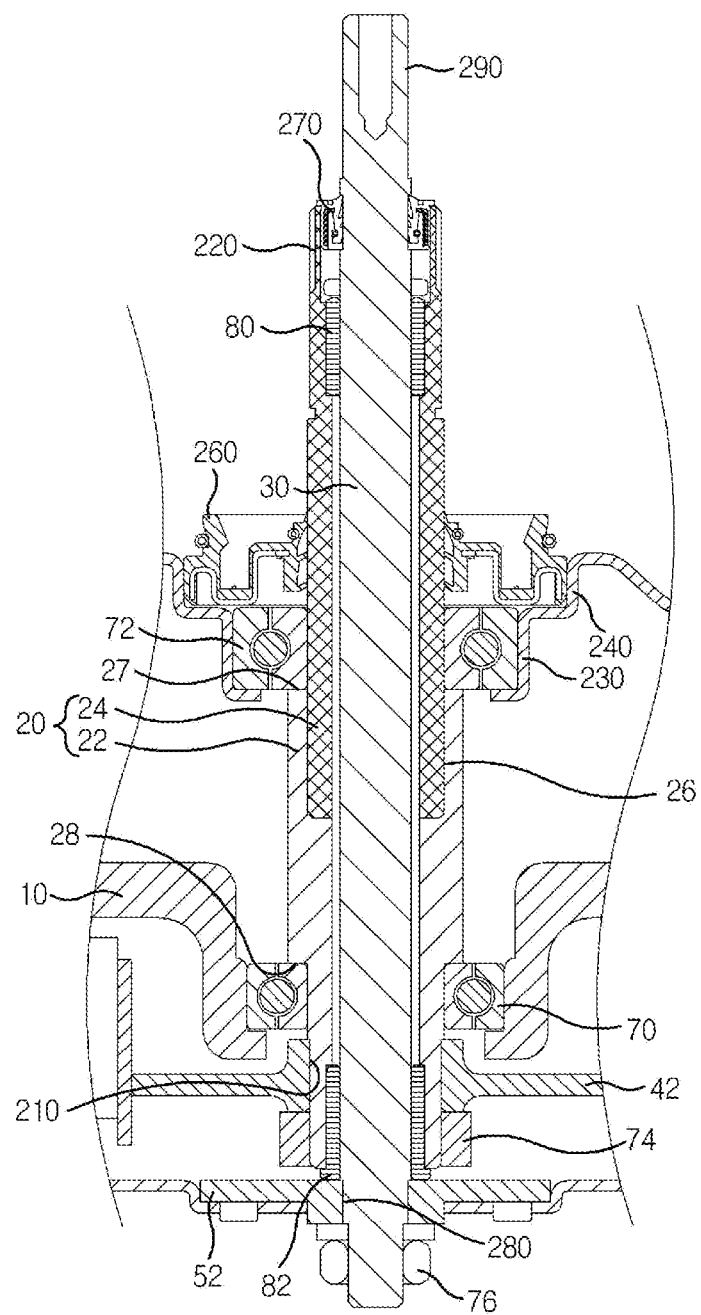
FIG. 3 is a cross-sectional view of an inner shaft and an outer shaft in accordance with the first embodiment of the present invention.

As shown in FIG. 3, the outer shaft 20 is formed in a cylindrical form so that the inner shaft 30 passes through the outer shaft 20, and includes: a first shaft 22 coupled to the inner rotor 40; and a second shaft 24 connected to an upper side of the first shaft 22 and coupled to the washing tub 120.

A press-fit groove 26 into which a lower end of the second shaft 24 is press-fitted is formed on the inside of an upper end of the first shaft 22, and a stepped portion 28 whose outer diameter becomes small is formed on an outer circumferential surface of an intermediate side of the first shaft 22, in which the first bearing 70 is mounted on the stepped portion 28 to thus prevent the first bearing 70 from moving up and down.

In addition, a first connecting portion 210 on which an inner rotor housing 42 of the inner rotor 40 is fixed is formed at a lower side of a portion where the first bearing 70 of the first shaft 22 is mounted, and a first tightening nut 74 which makes the inner rotor housing 42 fixed to the first shaft 22 is fastened at the lower side of the first connecting portion 210.

Here, the first bearing 70 is inserted into the stepped portion 28 formed on the outer circumferential surface of the first shaft 22, the inner rotor housing 42 is connected to the first connecting portion 210, and a first tightening nut 74 is coupled with the first connecting portion 210, to thereby complete an assembly conveniently. In addition, since the first bearing 70 is inserted into the stepped portion 28, the first bearing 70 is prevented from moving and the inner rotor housing 42 is prevented from being separated from the first shaft 22 by the first tightening nut 74.

The lower end of the second shaft 24 is press-fitted into the press-fit groove 26 of the first shaft 22 and is connected to the first shaft 22, the second bearing 72 is inserted into an outer circumferential surface thereof, and a second connecting portion 220 connected to the washing tub 120 is formed on an outer circumferential surface of an upper portion of a portion into which the second bearing 72 is inserted.

The second bearing 72 is stopped by a stepped portion 27 formed on top of the first shaft 22, to thus prevent the second bearing 72 from being seceded from the stepped portion 27.

The first connecting portion 210 and the second connecting portion 220 may be coupled by serration coupling or spline coupling through a protrusion formed on the outer surface of the first shaft 22, or by mutual key coupling through a key groove formed on the outer surface of the first shaft 22.

The first connecting portion 210 and the second connecting portion 220 may be coupled by employing any structure which can connect the inner rotor housing 42 and the washing tub 120, in addition to the above-described coupling methods.

The inner shaft 30 is rotatably disposed on an inner surface of the outer shaft 20, and the lower end of the inner shaft 30 is extended out from the lower end of the outer shaft 20. A third connecting portion 280 to which the outer rotor housing 52 is connected is formed at the lower end of the inner shaft 30. A second tightening nut 76 which prevents the outer rotor housing 52 from seceding from the third connecting portion 280 is coupled on the lower end of the inner shaft 30. Then, the top of the inner shaft 30 is extended from the top of the outer shaft 20 in which a fourth connecting portion 290 to which the pulsator 130 is connected is formed at the upper end of the inner shaft 30.

Here, the third connecting portion 280 and the fourth connecting portion 290 have a structure in which the third connecting portion 280 and the fourth connecting portion 290 may be coupled by serration coupling or spline coupling through protrusions formed on the outer surface of the inner shaft 30, the outer rotor housing 52 and the pulsator 130, or by mutual key coupling through key grooves formed on the outer surface of the inner shaft 30, the outer rotor housing 52 and the pulsator 130.

A first sleeve bearing 80 and a second sleeve bearing 82 are secured on the upper-inner circumferential surface and the lower-inner circumferential surface of the outer shaft 20. The inner shaft 30 is rotatably supported on the first sleeve bearing 80 and the second sleeve bearing 82.

Figure 4:
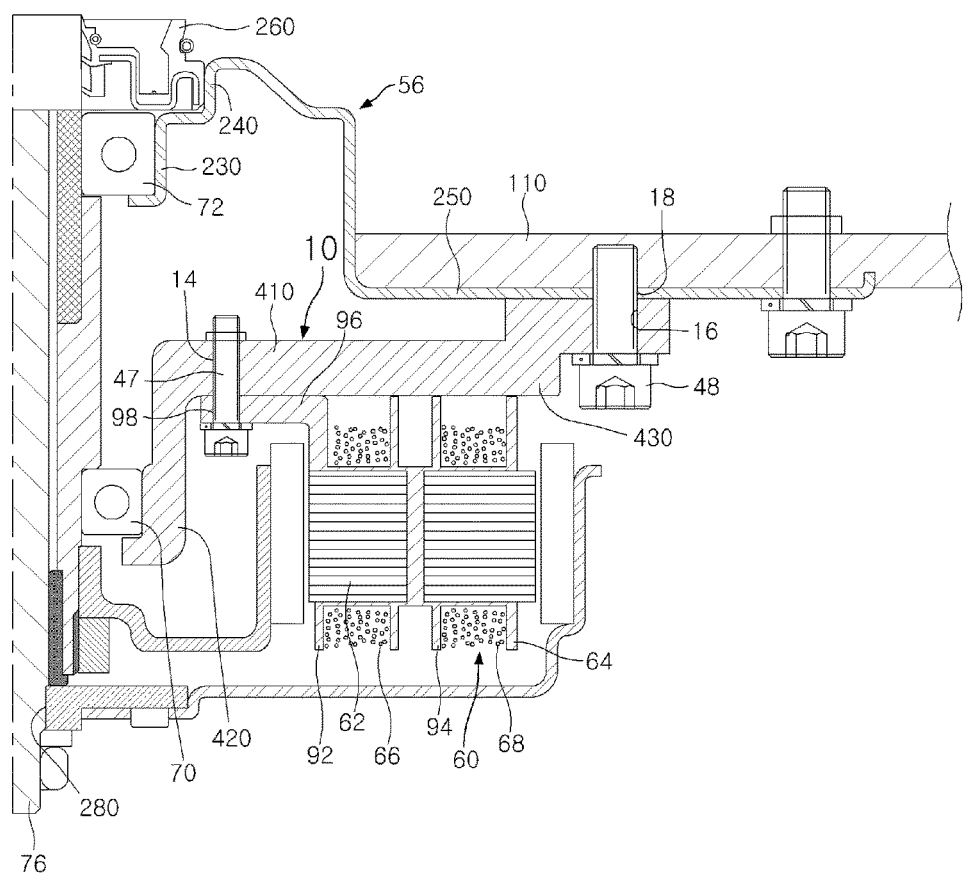
FIG. 4 is a cross-sectional view of half the driving apparatus of the washing machine according to the first embodiment of the present invention.

As shown in FIG. 4, the first bearing housing 10 includes: a bobbin coupling portion 410 which is formed of a disc shape and is coupled with bobbins 64 of the stator 60; a bearing mounting portion 420 which is bent in a downward direction from the inner side of the bobbin coupling portion 410 in which the first bearing 70 is mounted; and an outer tub fixing portion 430 which is bent in an upward direction from the outer side of the bobbin coupling portion 410 and fixed to an outer tub 110.

A plurality of first coupling holes 14 are formed in the bobbin coupling portion 410 in which a bolt 47 is coupled with each of the bobbins 64 of the stator 60 through each of the first coupling holes 14, and a plurality of second coupling holes 16 which are coupled on the outer tub 110 with a bolt 48 are formed on the outer tub fixing portion 430.

Here, the plurality of first coupling holes 14 and the plurality of second coupling holes 16 are formed circumferentially on the bobbin coupling portion 410 and the outer tub fixing portion 430 of the first bearing housing 10.

A second bearing housing 56 is formed of a metal material, and includes: a bearing mounting portion 230 which is formed at the central opening portion in which the second bearing 72 is mounted; a seal mounting portion 240 which is bent in an upward direction from the bearing mounting portion 230 in which a first seal 260 is mounted; and an outer tub fixing portion 250 which is bent in a downward direction from the seal mounting portion 240, in which a third coupling hole 18 is formed to be coupled on the outer tub 110 with a bolt 48.

Here, the outer tub fixing portion 430 of the first bearing housing 10 and the outer tub fixing portion 250 of the second bearing housing 56 are disposed so as to be mutually in contact with each other, and the second coupling hole 16 and the third coupling hole 18 are communicated from each other, to thus enable the two housings 10 and 56 to be fixed to the outer tub 110 by the single bolt 48.

In other words, the first bearing housing 10 and the second bearing housing 56 are arranged to be laminated on the rear surface of the outer tub 110, the bolt 48 is passed through the second coupling hole 16 of the first bearing housing 10 and the third coupling hole 18 of the second bearing housing 56, to then be coupled with the outer tub 110. Accordingly, the first bearing housing 10 and the second bearing housing 56 can be coupled with the outer tub 110 with the single bolt 48 simultaneously, to thus improve the assembling property.

The first seal 260 is mounted between the second bearing housing 56 and the outer surface of the outer shaft 20 to prevent the washing water from leaking, and a second seal 270 is mounted between the upper-inner surface of the outer shaft 20 and the upper-outer surface of the inner shaft 30, to prevent the washing water from leaking.

The inner rotor 40 includes: the inner rotor housing 42; and a first magnet 44 fixed on the outer surface of the inner rotor housing 42 and arranged with a certain gap in opposition to the inner surface of the stator 60. The first magnet 44 is fixed on the outer surface of the inner rotor housing 42 and the first connecting portion 210 of the outer shaft 20 is connected to the inner surface of the inner rotor housing 42.

In addition, the outer rotor 50 includes: the outer rotor housing 52; and a second magnet 54 which is fixed on the inner surface of the outer side of the outer rotor housing 52 and is disposed at a predetermined gap facing the outer surface 54 of the stator 60. The second magnet 54 is fixed to the inner surface of the outer side of the outer rotor housing 52 and the inner surface of the outer rotor housing 52 is connected to the third connecting portion 280 of the inner shaft 30.

Here, the inner rotor housing 42 and the rotor outer housing 52 are preferably formed of a magnetic passage forming material for forming a magnetic passage with no back yoke.

Figure 5:
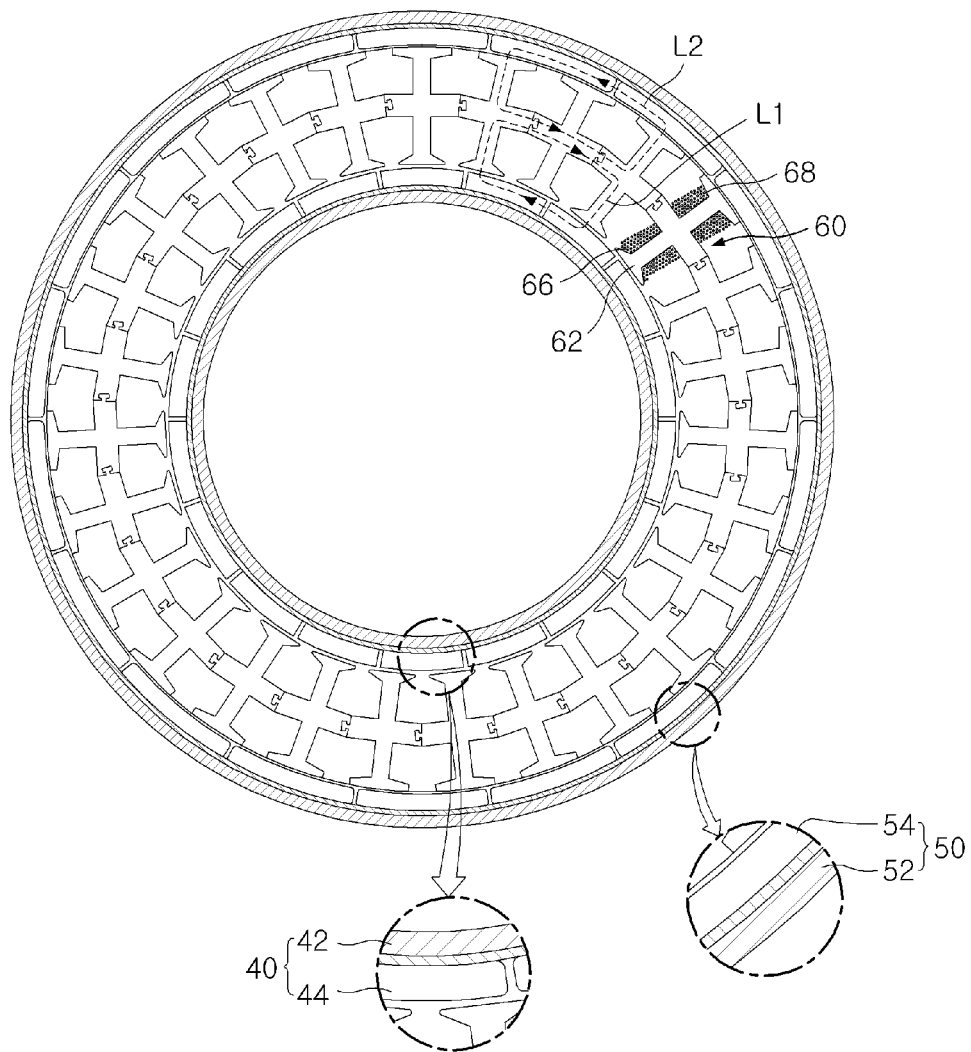
FIG. 5 is a transverse cross-sectional view of a stator according to the first embodiment of the present invention.
Figure 6:
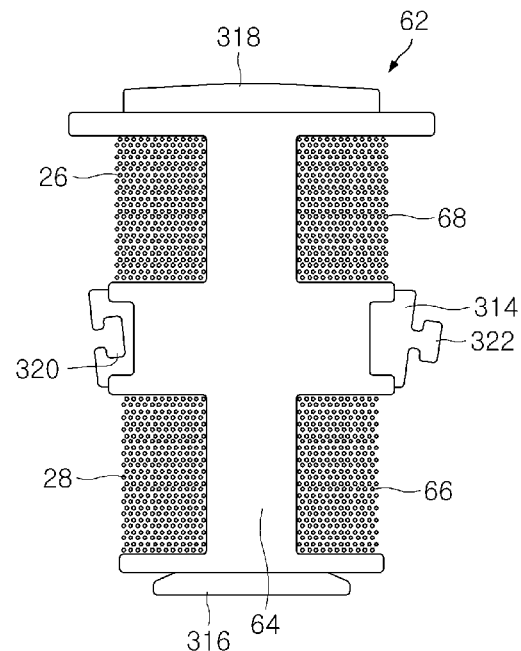
FIG. 6 is a plan view of the stator according to the first embodiment of the present invention.
Figure 7:
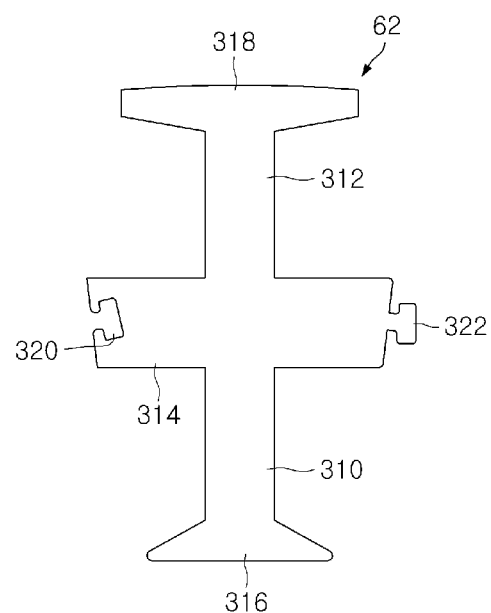
FIG. 7 is a plan view of a stator core according to the first embodiment of the present invention.

As shown in FIGS. 5 to 7, the stator 60 includes: a plurality of stator cores 62 which are radially arranged; bobbins 64 made of a non-magnetic material, and surrounded on the outer circumferential surfaces of the stator cores 62; a first coil 66 wound on one side of each of the stator cores 62; and a second coil 68 wound on the other side of each of the stator cores 62.

Here, each of the bobbins 64 includes: a first coil winding portion 92 which is wrapped around the outer surface of the stator core 62 and on which a first coil 66 is wound; a second coil winding portion 94 on which a second coil 68 is wound at a state where the second coil 68 is partitioned from the first coil 66; and the coupling portion 96 which is extended from the first coil winding portion 92 and coupled with the first bearing housing 10.

The coupling portion 96 is formed in a disc shape which is extended perpendicularly to the end of the first coil winding portion 92 and is in contact with the lower surface of the bobbin coupling portion 410 of the first bearing housing 10, in which a plurality of bolt coupling holes 98 are circumferentially formed.

Here, each of the plurality of bolt coupling holes 98 is communicated from a first coupling hole 14 formed in the bobbin coupling portion 410 and coupled by a bolt 47.

A stator coupling structure according to the present invention will be described as follows. First, the coupling portion 96 is integrally formed on each of the bobbins 64, and is coupled by the bolt 47 at a state where the coupling portion 96 is in contact with the first bearing housing 10, to accordingly secure the stator 60. As a result, an existing separate stator support and so on is unnecessary, to thus reduce the number of parts and shorten an assembly process.

Here, a first power source, that is, a drive signal is applied to the first coil 66, and a second power source, that is, a drive signal is applied to the second coil 68. Thus, when the first power source is applied to only the first coil 66, only the inner rotor 40 is rotated, when the second power source is applied to only the second coil 68, only the outer rotor 50 is rotated, and when the first power source and the second power source are simultaneously applied to the first coil 66 and the second coil 68, respectively, the inner rotor 40 and the outer rotor 50 are rotated simultaneously.

Each of the stator cores 62 includes: a first tooth portion 310 on which the first coil 66 is wound; a second tooth portion 312 which is formed on the other side of the first tooth portion 310 and on which the second coil 68 is wound; a partitioning portion 314 for dividing between the first and second tooth portions 310 and 312; and coupling units 320 and 322 which are formed at both side ends on the partitioning portion 314 and which mutually connect between the stator cores 62.

A first flange portion 316 which is arranged to face the first magnet 44 is formed at the end of the first tooth portion 310, and a second flange portion 318 which is arranged to face the second magnet 54 is formed at the end of the second tooth portion 312.

The first flange portion 316 and the second flange portion 318 are configured to form inwardly and outwardly curved surfaces at a predetermined curvature to correspond to the first magnet 44 of the inner rotor 40 and the second magnet 54 of the outer rotor 50. Thus, roundness of the inner and outer circumferential surfaces of the stator core 62 increases, and thus the inner and outer circumferential surfaces of the stator are close to the first magnet 44 and the second magnet 54, respectively, but a predetermined magnetic gap may be maintained.

The stator cores 62 have a structure that the stator cores 62 are directly connected to each other, so as to form a magnetic circuit between the stator cores 62. Thus, the coupling units 320 and 322 have a structure that the coupling units 320 and 322 are directly connected between the stator cores 62 so that the stator cores 62 may be energized each other.

As an example, these coupling units 320 and 322 are configured so that a coupling protrusion 322 is protrudingly formed at one side of the partitioning portion 314 and a coupling groove 320 with which the coupling protrusion 322 is fitted and coupled is formed at the other side of the partitioning portion 314. Thus, when the coupling protrusion 322 is fitted into and coupled with the coupling groove 320, the stator cores 62 are radially arranged, and have a directly cross-linked structure that the stator cores 62 are directly connected with each other.

Here, the stator cores 62 are formed of the split cores as described above, and can be formed of a structure that the stator cores 62 are formed in an annular shape in which the coupling portions are integrally formed with the stator cores 62, in addition to the structure that the stator cores 62 are coupled with each other by using the coupling units 320 and 322.

In addition, the stator cores can be formed in a partial split type in which a split core includes a plurality of slots and coupled by the coupling portions, other than the structure that the stator cores are split for each slot.

Figure 8:
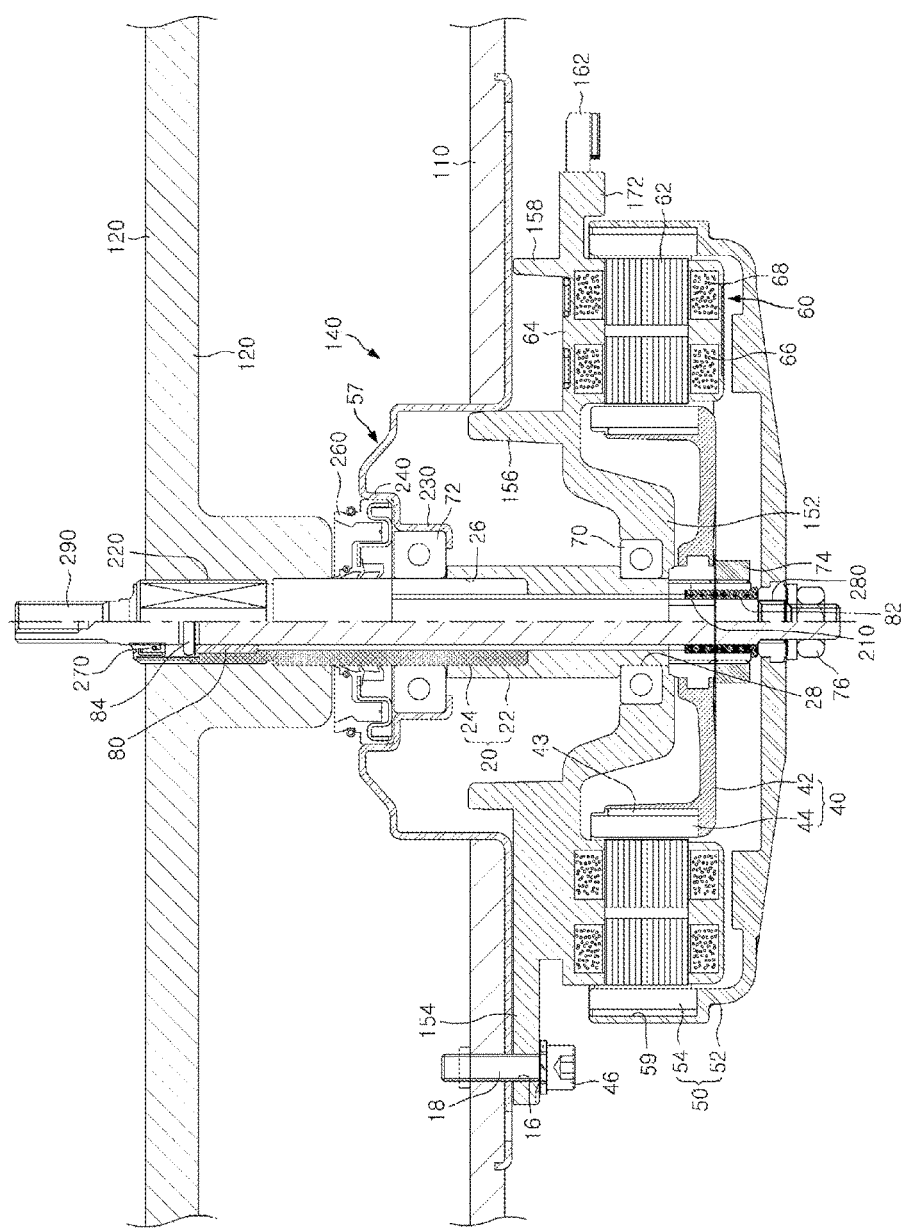
FIG. 8 is a cross-sectional view of a driving apparatus of a washing machine according to a second embodiment of the present invention.
Figure 9:
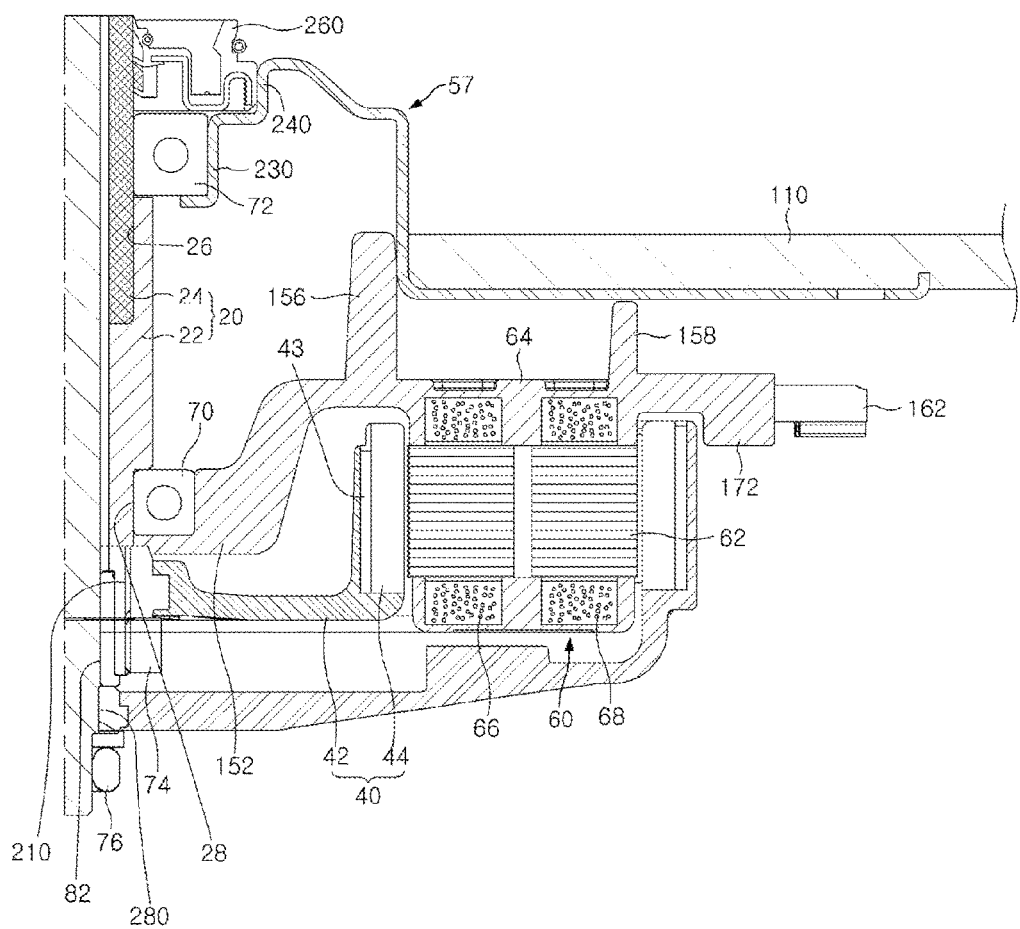
FIG. 9 is a cross-sectional view of half the driving apparatus of the washing machine according to the second embodiment of the present invention.

FIG. 8 is a cross-sectional view of a driving apparatus of a washing machine according to a second embodiment of the present invention, and FIG. 9 is a cross-sectional view of half the driving apparatus of the washing machine according to the second embodiment of the present invention.

The driving apparatus 140 according to the second embodiment includes: an outer shaft 20 which is connected with a washing tub 120; an inner shaft 30 which is rotatably arranged inside the outer shaft 20 and connected with a pulsator 130; an inner rotor 40 which is connected with the outer shaft 20; an outer rotor 50 which is connected to the inner shaft 30; and a stator 60 which is disposed with an air gap between the inner rotor 40 and the outer rotor 50.

The outer shaft 20 and the inner shaft 30 according to the second embodiment are the same as the outer shaft 20 and inner shaft 30 according to the first embodiment described above.

The outer shaft 20 is rotatably supported by a first bearing 70 and a second bearing 72. The first bearing 70 is mounted on a bearing support portion 152 which is formed integrally with the bobbin 64 of the stator 60, and the second bearing 72 is mounted on a bearing housing 56.

The second bearing housing 56 is formed of a metal material, and includes: a bearing mounting portion 230 which is formed at the central opening portion in which the second bearing 72 is mounted; a seal mounting portion 240 which is bent in an upward direction from the bearing mounting portion 230 in which a first seal 260 is mounted; and an outer tub fixing portion 250 which is bent in a downward direction from the seal mounting portion 240, in which a third coupling hole 18 is formed to be coupled on the outer tub 110 with a bolt 48.

The first seal 260 is mounted between the second bearing housing 56 and the outer surface of the outer shaft 20 to prevent the washing water from leaking, and a second seal 270 is mounted between the upper-inner surface of the outer shaft 20 and the upper-outer surface of the inner shaft 30, to prevent the washing water from leaking.

The inner rotor 40 includes: an inner rotor housing 42; and a first magnet 44 fixed on the outer surface of the inner rotor housing 42 and disposed to face the inner surface of the stator 60 with a predetermined gap. The inner rotor housing 42 is configured so that the first magnet 44 is fixed on the outer surface of the inner rotor housing 42 and the first connecting portion 210 of the outer shaft 20 is connected to the inner surface of the inner rotor housing 42.

In addition, the outer rotor 50 includes: an outer rotor housing 52 and a second magnet 54 which is fixed on the inner surface of the outer side of the outer rotor housing 52 and is disposed at a predetermined gap facing the outer surface 54 of the stator 60. The second magnet 54 is fixed to the inner surface of the outer side of the outer rotor housing 52 and the inner surface of the outer rotor housing 52 is connected to the third connecting portion 280 of the inner shaft 30.

Here, the inner rotor housing 42 and the outer rotor housing 52 are integrally formed with the first magnet 44 and the second magnet 54 by insert injection. In addition, the inner rotor housing 42 and the outer rotor housing 52 can employ a structure that back yokes 43 and 59 are provided at the rear ends of the first magnet 44 and the second magnet 54, respectively, and can be formed of a magnetic passage forming material for forming a magnetic passage with no back yoke.

The stator 60 includes: a plurality of stator cores 62 which are radially arranged; bobbins 64 made of a non-magnetic material, and surrounded on the outer circumferential surfaces of the stator cores 62; a first coil 66 wound on one side of each of the stator cores 62; and a second coil 68 wound on the other side of each of the stator cores 62.

Here, each of the bobbins 64 is integrally formed on the outer surface of each of the stator cores 62 by insert injection after arranging the stator cores 62 in a mold. Here, the bobbins 64 are integrally formed with a bearing support 152 for supporting the first bearing 70 and an outer tub fixing portion 154 fixed to the outer tub 110.

In other words, the bobbins 64 are formed to be wrapped around the outer surfaces of the stator cores 62 by insert injection, the bearing support portion 152 is extended inward from the inner surface of the bobbins 64, and the outer tub fixing portion 154 is extended outward from the outer surfaces of the bobbins 64.

The bearing support portion 152 and the outer tub fixing portion 154 are integrally formed when forming the bobbins 64 by insert injection.

Here, the bearing support portion 152 and the outer tub fixing portion 154 may be integrally formed with the stator cores 62 by insert injection in a state where a reinforcement member of a metal material is inserted for reinforcing strength. Here, the reinforcement member of a metal material can employ an iron material or aluminum material similar to those of the bearing support portion 152 and the outer tub fixing portion 154.

Here, a plurality of the outer tub fixing portions 154 are formed at intervals in the circumferential direction on the outer surfaces of the bobbins 64, in which second coupling holes 16 for coupling bolts are formed.

The outer tub fixing portion 154 is arranged in contact with the rear surface of the bearing housing 56, in which the first coupling hole 18 formed on the bearing housing 56 communicates with the second coupling hole 16, and thus the outer tub fixing portion 154 is fixed to the outer tub 110 by a single bolt 46.

Position alignment protrusions 156 and 158 for aligning assembly positions when assembling the bearing housing 56 and the stator 60 each other are formed on the upper surface of each of the bobbins 64. In other words, the position alignment protrusions include a first alignment protrusion 156 which protrudes from the upper surface of each of the bobbins 64 and is in contact with the inner surface of the bearing housing 56, and a second alignment protrusion 158 which is formed at intervals on the outer side of the first alignment protrusion 156 and is in contact with the rear surface of the bearing housing 56.

In this way, when the stator 60 and the bearing housing 56 are assembled, the first alignment protrusion 156 is in contact with the inner surface of the bearing housing 56, and the second alignment protrusion 158 is in contact with the rear surface of the bearing housing 56, so that the assembly position of the bearing housing 56 and the stator 60 is arranged to thus make it easier to assemble the bearing housing 56 and the stator 60.

The stator 60 according to the present invention is configured so that the bearing support portion 152 for supporting the first bearing 72 and the outer tub fixing portion 154 for fixing the stator 60 to the outer tub 110 are integrally formed when the bobbins 64 are prepared by insert injection, to thereby have no need to provide a separate fixing frame for fixing the stator 60 to the outer tub, to thus reduce the number of parts, to thus shorten a manufacturing process thereof, to thus reduce an assembly process thereof, to thus reduce a producing cost, and to thus improve productivity.

Figure 10:
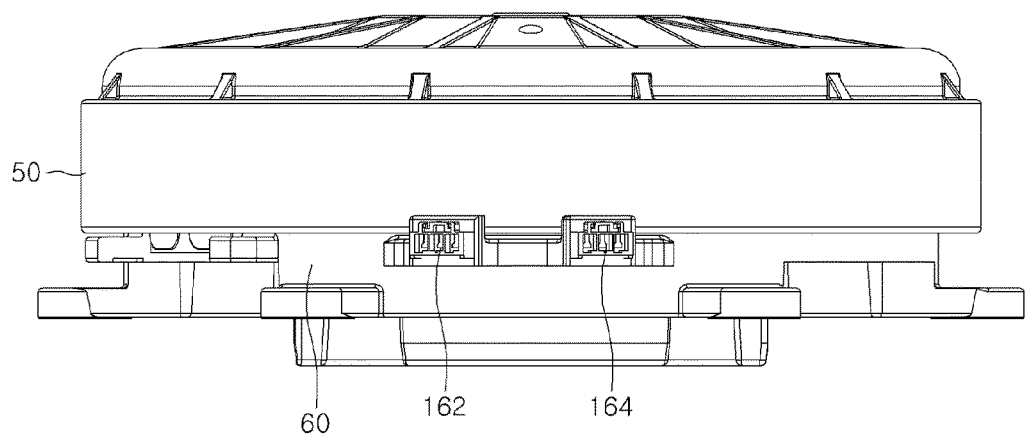
FIG. 10 is a side view showing the driving apparatus of the washing machine according to the second embodiment of the present invention.
Figure 11:
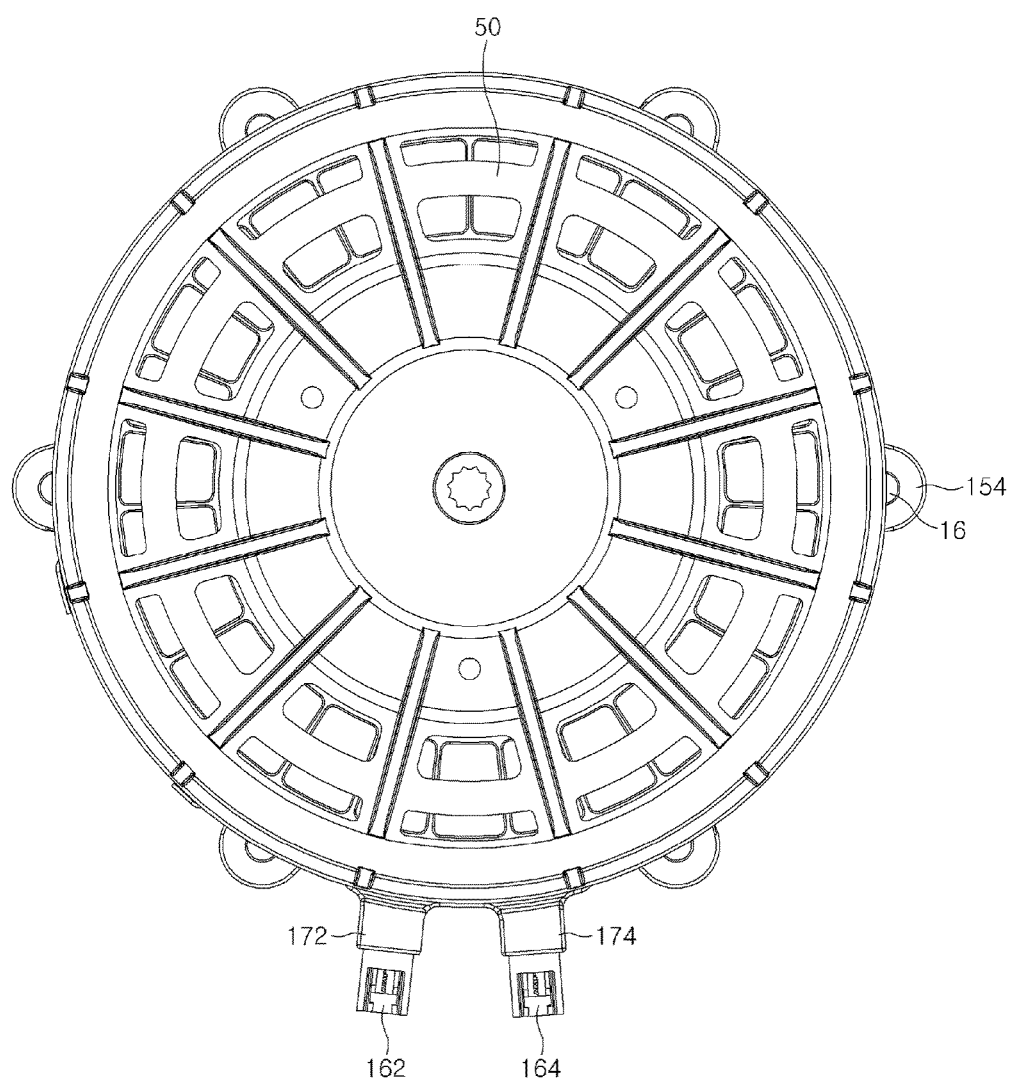
FIG. 11 is a rear view showing the driving apparatus of the washing machine according to the second embodiment of the present invention.
Figure 12:
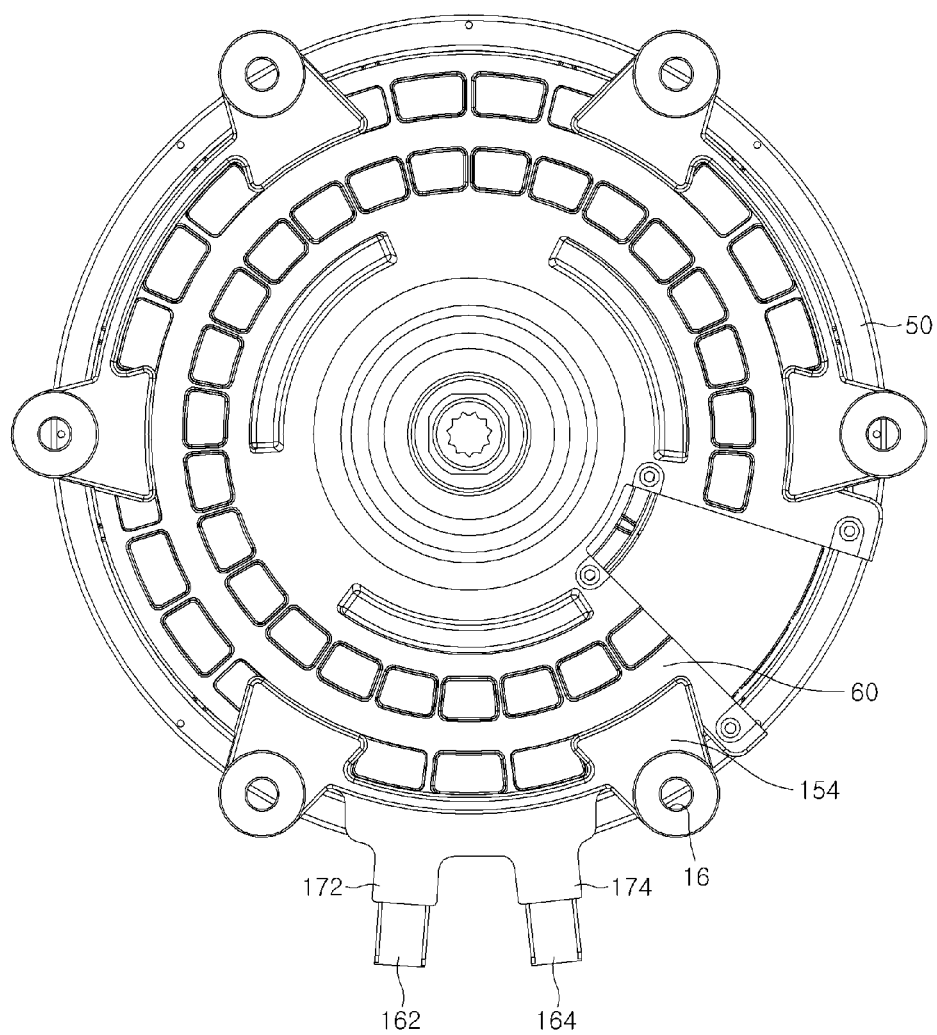
FIG. 12 is a top view showing the driving apparatus of the washing machine according to the second embodiment of the present invention.

FIG. 10 is a side view showing the driving apparatus of the washing machine according to the second embodiment of the present invention. FIG. 11 is a rear view showing the driving apparatus of the washing machine according to the second embodiment of the present invention. FIG. 12 is a top view showing the driving apparatus of the washing machine according to the second embodiment of the present invention.

Connectors 162 and 164 for applying external power to the first coil 66 and second coil 68, respectively are provided on the outside of the stator 60. The connectors include a first connector 162 for applying an external power source to the first coil 66 in order to rotate the washing tub 120, and a second connector 164 for applying an external power source to the second coil 68 in order to rotate the pulsator 130.

A first connector fixing portion 172 to which the first connector 162 is fixed and a second connector fixing portion 174 to which the second connector 164 is fixed are formed on the outer surface of each of the bobbins 64.

Here, the first connector fixing portion 172 and the second connector fixing portion 174 are integrally formed when the bobbins 64 are insert injected. That is, when the first connector 162 and the second connector 164 are placed in a mold and then subjected to molding, the first connector fixing portion 172 is wrapped on the outer surface of the first connector 162 thereby fixing the first connector 162, and the second connector fixing portion 174 is wrapped on the outer surface of the second connector 164, thereby fixing the second connector fixing portion 174.

Here, a first power source is applied to the first coil 66, and a second power source is applied to the second coil 68. Thus, when the first power source is applied to only the first coil 66, only the inner rotor 40 is rotated, when the second power source is applied to only the second coil 68, only the outer rotor 50 is rotated, and when the first power source and the second power source are simultaneously applied to the first coil 66 and the second coil 68, respectively, the inner rotor 40 and the outer rotor 50 are rotated simultaneously.

Here, since the first power source connected via the first connector 162 is applied to the first coil 66 and the second power source connected via the second connector 168 is applied to the second coil 68, the respectively different power sources can be applied to the first coil 66 and the second coil 68, to thereby separately drive the inner rotor 40 and the outer rotor 50.

The driving apparatus according to the present invention forms a first magnetic circuit L1 between the inner rotor 40 and one side of the stator 60 where the first coil 66 is wound, and forms a second magnetic circuit L2 between the outer rotor 50 and the other side of the stator 60 where the second coil 68 is wound, to thus form a pair of magnetic circuits each independent to each other. As a result, the inner rotor 40 and the outer rotor 50 can be respectively driven separately.

More specifically, the first magnetic circuit L1 includes a first magnet 44 of an N-pole, a first tooth portion 310 on which the first coil 66 is wound, an inner part of the partitioning portion 314, the first magnet 44 of an S-pole adjacent to the first magnet 44 of the N-pole, and an inner rotor housing 42.

In addition, the second magnetic circuit L2 includes a second magnet 54 of an N-pole, a second tooth portion 312 facing the second magnet 54 of the N-pole and on which the second coil 68 is wound, an outer part of the partitioning portion 314, the second magnet 54 of an S-pole, and an outer rotor housing 52.

The operation of the driving apparatus of the washing machine according to the embodiments of the present invention will be described on the following.

First, when power is supplied to the second coil 68, in order to drive only the pulsator 130 during washing, the outer rotor 50 is rotated and the inner shaft 30 which is connected to the outer rotor 50 is rotated, to accordingly rotate the pulsator 130.

In addition, when the power is simultaneously applied to the first coil 66 and the second coil 68, in order to rotate both the pulsator 130 and the washing tub 120 during dehydrating and rinsing, the inner rotor 40 is rotated and the outer shaft 20 which is connected to the inner rotor 40 is rotated, by the magnetic circuit L1, to accordingly rotate the washing tub 120. Simultaneously, the outer rotor 50 is rotated and the inner shaft 30 which is connected to the outer rotor 50 is rotated, by the magnetic circuit L2, to accordingly rotate the pulsator 130.

Then, when the pulsator 130 and the washing tub 120 are rotated in opposite directions, in order to perform the release stroke or remove an entanglement of the laundry 130, power is applied to the first coil 66 and the second coil 68 in the opposite directions to each other. Then, the inner rotor 40 and the outer rotor 50 are rotated in the opposite directions to each other, and the pulsator 130 and the washing tub 120 are also rotated in the opposite directions to each other.

It has been described in the above-described embodiments that a larger number of the split type stator cores which are divided for respective slots and are mutually bonded may be used as the stator, but it is of course possible to form respective split type stator cores to have a partial split type structure having a plurality of slots or to form the stator core as a one-piece core not the split type.

As described above, the present invention has been described with respect to particularly preferred embodiments. However, the present invention is not limited to the above embodiments, and it is possible for one of ordinary skill in the art to make various modifications and variations, without departing off the spirit of the present invention. Thus, the protective scope of the present invention is not defined within the detailed description thereof but is defined by the claims to be described later and the technical spirit of the present invention.

The present invention relates to a washing machine driving apparatus and a washing machine having the same in which a washing tub and a pulsator are directly connected to the washing machine driving apparatus, to thus drive the washing tub and the pulsator, respectively, without having a separate intermediate mediator. A motor used for the washing machine driving apparatus is of a double rotor and double stator type, in which an inner rotor and an outer rotor are connected to a pulsator and a washing tub of the washing machine, respectively, to thus drive the pulsator and the washing tub independently and form a variety of washing water flows.

What is claimed is:

1. A washing machine driving apparatus comprising:
an outer shaft which is connected with a washing tub;
an inner shaft which is rotatably arranged inside the outer shaft and connected with a pulsator;
an inner rotor which is connected with the outer shaft;
an outer rotor which is connected to the inner shaft; and
a stator which is disposed with an air gap between the inner rotor and the outer rotor,
wherein the stator comprises: stator cores; a bobbin wrapped on an outer surface of each of the stator cores; a first coil wound on one side of each of the stator cores; and a second coil wound on an opposite side to the one side of each of the stator cores,
wherein a first bearing and a second bearing are disposed on an outer circumferential surface of the outer shaft, and the first bearing and the second bearing are mounted in a first bearing housing and a second bearing housing which are fixed to an outer tub, respectively and wherein an outer tub fixing portion which enables the stator to be fixed on the outer tub is integrally formed with the bobbins.

2. The washing machine driving apparatus according to claim 1, wherein a bearing support extending from an inner side surface of each of the bobbins thereby supporting the first bearing, and the outer tub fixing portion extending from an outer side surface of each of the bobbins to then be fixed on the outer tub.

3. The washing machine driving apparatus according to claim 2, wherein the bearing support and the outer tub fixing portion are insert injected with the stator in a state that a reinforcing material of a metallic material for strength reinforcement is inserted into the bearing support and the outer tub fixing portion.

4. The washing machine driving apparatus according to claim 2, wherein the outer tub fixing portion includes a plurality of outer tub fixing portions, which are formed at intervals in a circumferential direction on an edge portion of the bobbins and provided with a second coupling hole through which a bolt is coupled.

5. The washing machine driving apparatus according to claim 2, wherein the bearing support and the outer tub fixing portion are integrally formed when forming the bobbin by insert injecting on each of the stator cores.

6. The washing machine driving apparatus according to claim 2, wherein each of the bobbins comprises a first alignment protrusion which is in contact with a rear surface of the second bearing housing and a second alignment protrusion which is in contact with an inner side surface of the second bearing housing.

7. A washing machine comprising:

a washing machine driving apparatus according to claim 1 to drive the washing tub and the pulsator simultaneously or selectively, wherein the outer tub which is suspended and supported on an inside of a case for receiving washing water;

the washing tub which is rotatably disposed inside the outer tub to perform washing and dehydrating; and the pulsator which is rotatably disposed inside the washing tub to form a washing water flow.

* * * * *